Figure 3:
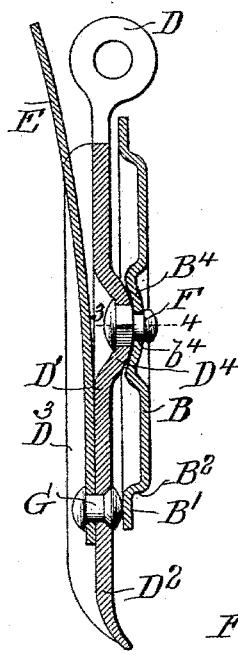

(No Model.) 5 Sheets—Sheet 1.

N. H. DAVIS.
CAR AXLE BOX LID.

No. 597,800. Patented Jan. 25, 1898.

Witnesses.

Inventor.
Nathan H. Davis
by Francis T. Chambers
his Attorney.

(No Model.) 5 Sheets—Sheet 2.

N. H. DAVIS.
CAR AXLE BOX LID.

No. 597,800. Patented Jan. 25, 1898.

Witnesses:

Inventor.
Nathan H. Davis
by Francis T. Chambers
his Attorney.

(No Model.) 5 Sheets—Sheet 3.
N. H. DAVIS.
CAR AXLE BOX LID.
No. 597,800. Patented Jan. 25, 1898.
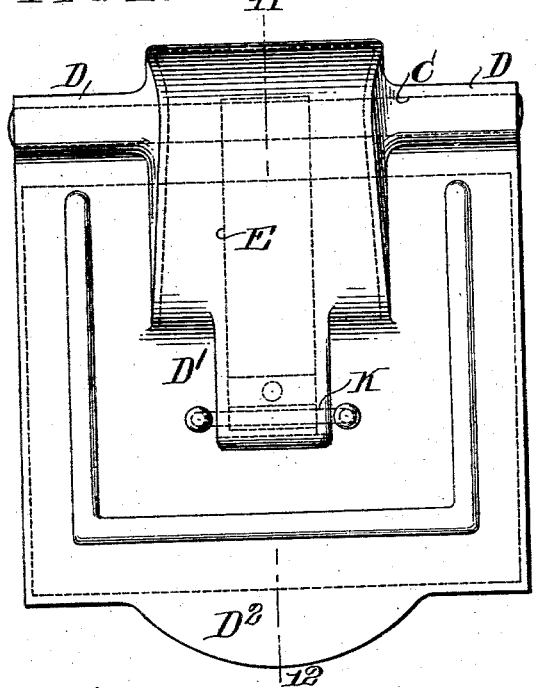
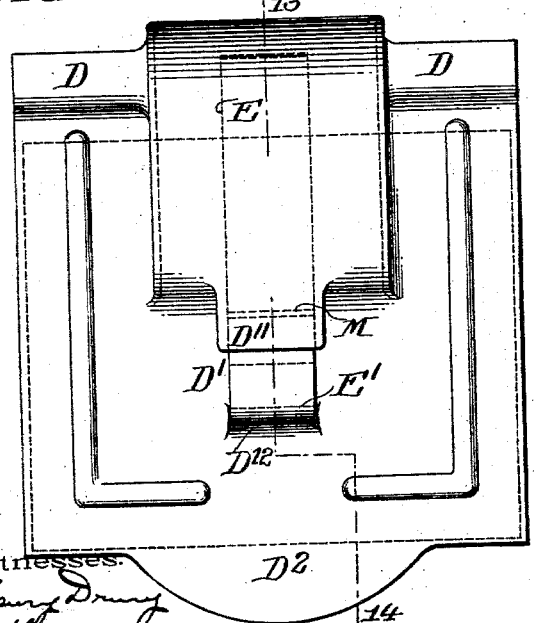
Witnesses. Inventor.
Nathan H. Davis
Francis F. Chambers
his Attorney.

(No Model.) 5 Sheets—Sheet 4.
N. H. DAVIS.
CAR AXLE BOX LID.
No. 597,800. Patented Jan. 25, 1898.
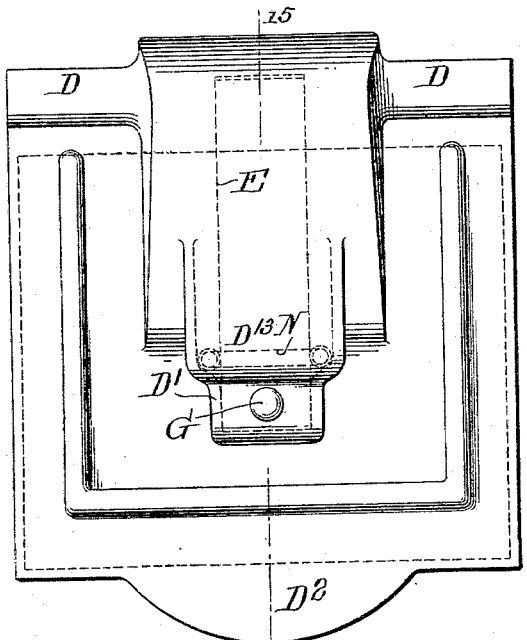
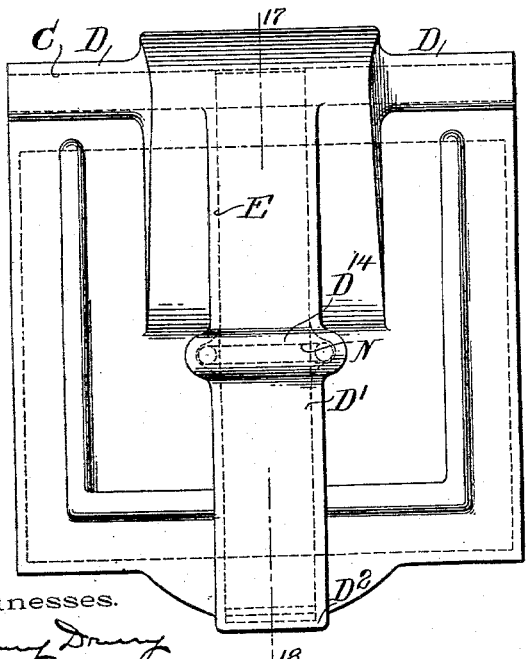
Witnesses.
Inventor.

(No Model.) 5 Sheets—Sheet 5.

N. H. DAVIS.
CAR AXLE BOX LID.

No. 597,800. Patented Jan. 25, 1898.

Witnesses.

Inventor.
Nathan H. Davis
by Francis T. Chambers
his Attorney.

United States Patent Office.

NATHAN H. DAVIS, OF PHILADELPHIA, PENNSYLVANIA.

CAR-AXLE-BOX LID.

SPECIFICATION forming part of Letters Patent No. 597,800, dated January 25, 1898.

Application filed July 31, 1897. Serial No. 646,588. (No model.)

*To all whom it may concern:*

Be it known that I, NATHAN H. DAVIS, a citizen of the United States of America, residing in the city and county of Philadelphia, in the State of Pennsylvania, have invented a certain new and useful Improvement in Car-Axle-Box Lids, of which the following is a true and exact description, reference being had to the accompanying drawings, which form a part thereof.

My invention relates to axle-box lids such as are used for closing the openings in the axle-boxes of cars, and particularly to that type of lids which are secured to the box by means of a pintle-hinge.

As heretofore constructed it has been found practically impossible to provide such axle-box lids as will make a perfectly tight closure of the opening in the box, and the principal difficulty in obtaining the tight closure is due to the fact that the position of the lid is always controlled to a greater or less extent by its hinge-joint, so that unless the bearing-surface around the opening in the box is accurately adapted to the hinge the lid does not come into actual contact with all parts of the bearing and an opening or openings are left through which dirt can enter the box.

The object of my invention is to provide a lid the position of which upon the box will be to such degree independent of the position of its hinge as to enable the lid to accommodate itself freely to the face of the box, thus insuring the tight closing of the box irrespective of the variations in the hinge, which are in practice unavoidable.

Generally speaking, my invention consists in providing a spring-supporting plate with hinge-eyes, by which it can be secured to the box in the usual way in which lids are now secured and loosely connecting to the under side of this spring-supporting plate a box-closing plate or lid proper, the means uniting the two plates being such as will permit the box-closing plate to accommodate itself to the face of the bearing on the box. This may be accomplished in a great many different ways, and in the drawings I have illustrated several modifications, all embodying my invention.

Figure 1:
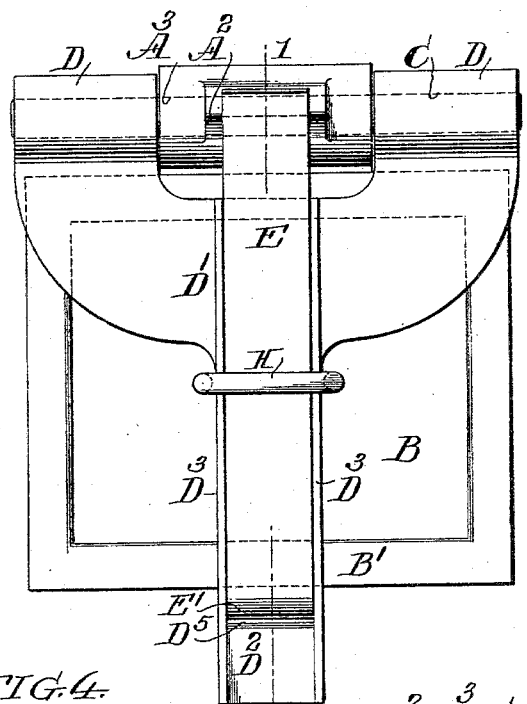
Figure 2:
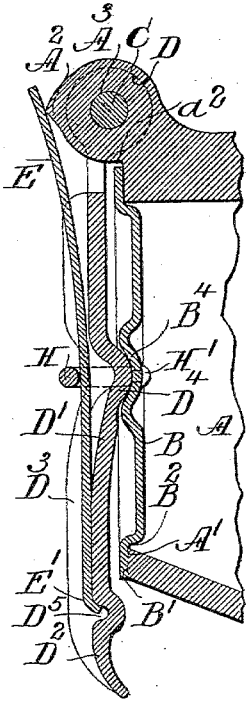
Figure 4:
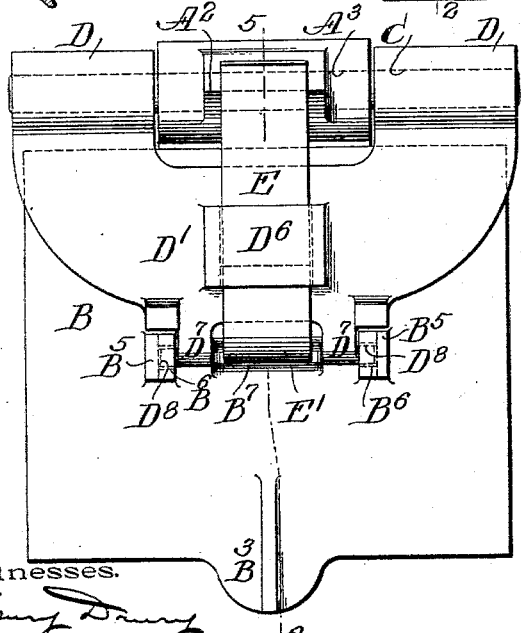
Figure 5:
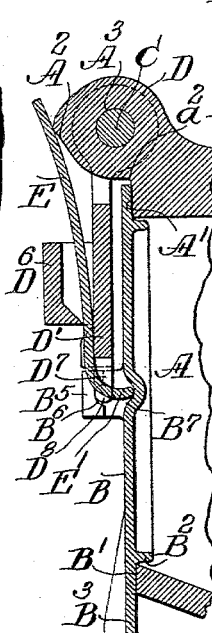
Figure 3A:
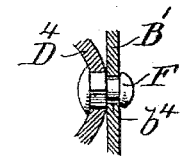
Figure 6:
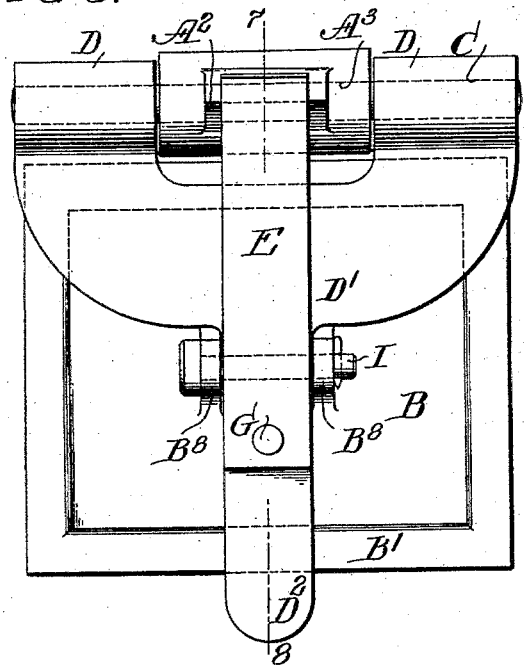
Figure 7:
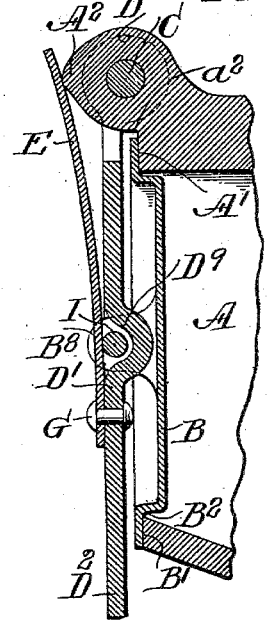
Figure 8:
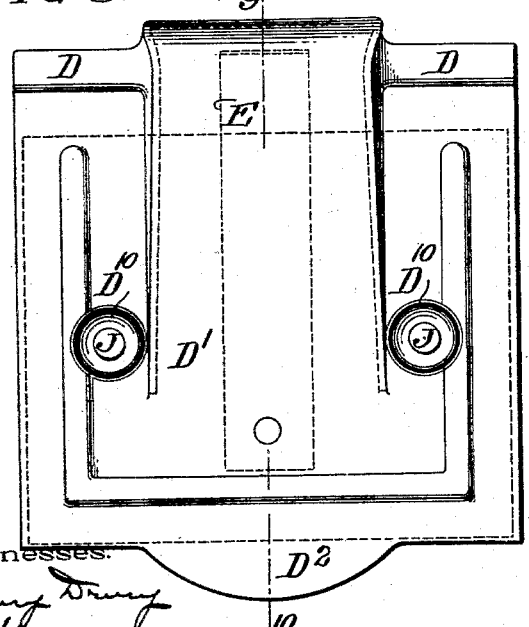
Figure 9:
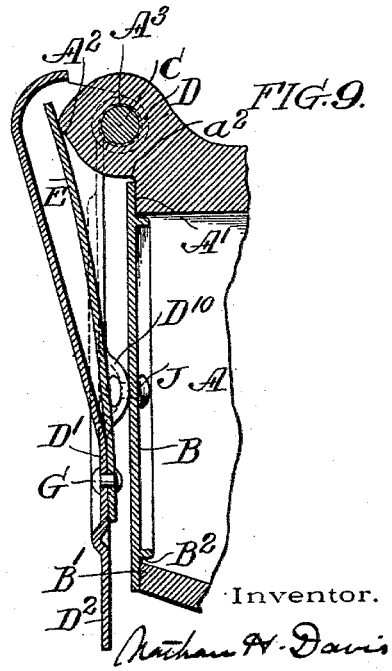
Figure 18:
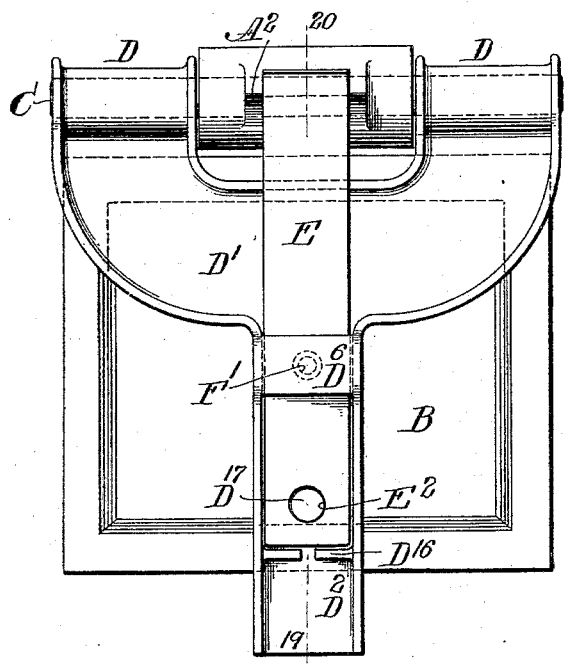
Figure 19:
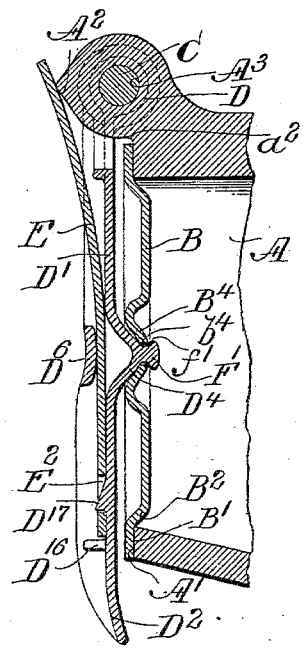
Figure 20:
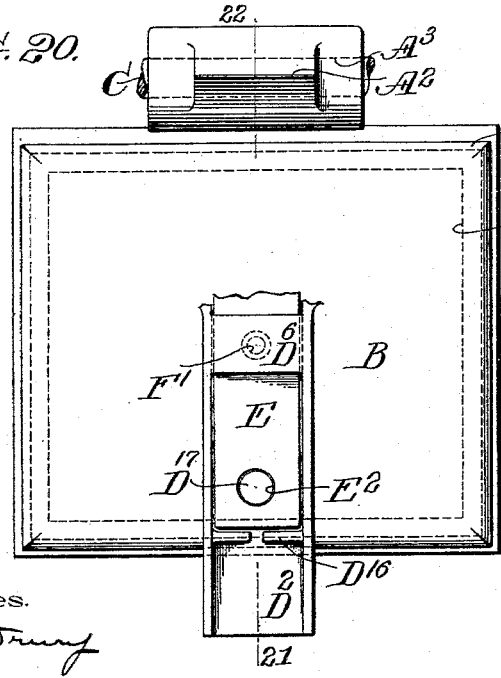
Figure 21:
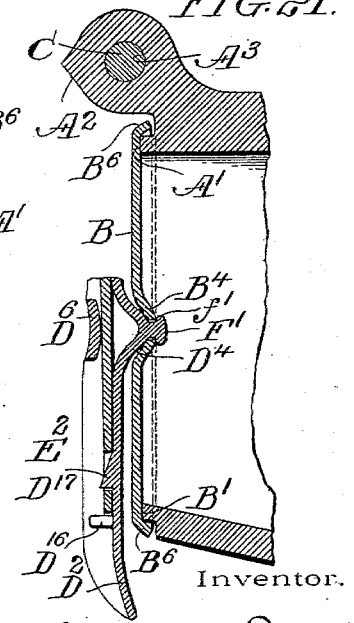

Reference being now had to the drawings, Figure 1 is a face view of one construction of axle-box lid embodying my invention. Fig. 2 is a cross-section taken on the line 1 2 of Fig. 1, showing also a portion of the axle-box. Fig. 3 is a sectional view of a modification. Fig. $3^a$ is a sectional view taken on the line 3 4 of Fig. 3. Fig. 4 is a face view of another construction embodying my invention; Fig. 5, a cross-sectional view taken on the line 5 6 of Fig. 4. Fig. 6 is a face view of another modification; Fig. 7, a sectional view taken on the line 7 8 of Fig. 6. Fig. 8 is a face view of another modification; Fig. 9, a sectional view taken on the line 9 10 of Fig. 8. Fig. 10 is a face view of still another modification. Fig. 11 is a sectional view on the line 11 12 of Fig. 10. Fig. 12 is a face view of still another modification; Fig. 13, a sectional view on the line 13 14 of Fig. 12. Fig. 14 is a face view of another modification; Fig. 15, a sectional view on the line 15 16 of Fig. 14. Fig. 16 is a face view of another modification; Fig. 17, a sectional view on the line 17 18 of Fig. 16. Fig. 18 is a face view of still another and my preferred construction. Fig. 19 is a section on line 19 20 of Fig. 18, and Figs. 20 and 21 are face and sectional views of another modification.

A indicates the axle-box, or, rather, that portion of it in which the opening for the insertion of oil-waste is formed and to which the lid is hinged.

A' indicates the bearing for the lid around the opening in the box; $A^2$, the usual horn or projection from the top of the box, to which the lid is hinged and upon which the spring rests. $a^2$ indicates the front of this horn where it registers with the bearing-surface A' at the top of the opening.

B is the lid or that portion of it which covers and closes the opening in the box. It may be made either of pressed steel or iron, as indicated in Figs. 2, 3, 7, 11, 13, 15, and 17, or of cast metal, as indicated in Figs. 5 and 9. In each case it is provided with a bearing-surface B', adapted to fit upon the bearing-surface A' of the box, and preferably in all cases is provided also with an inwardly-extending flange, as indicated at $B^2$, said flange being either made in casting or by pressing the metal, as shown in the different drawings, and being adapted to fit in the mouth of the opening of the box. C indicates the usual hinge, upon which it passes through an opening $A^3$ in the horn $A^2$ and is engaged by the pintle-hinge eyes D D of the spring-supporting plate $D'$, which plate may be either of cast metal or of wrought metal stamped to shape, cast-metal constructions being shown in Figs. 2, 3, 5, and 7 and stamped wrought-metal constructions being shown in Figs. 9, 11, 13, 15, and 17. The spring-supporting plate may be either only of a size, form, and dimensions required to support the spring—as, for instance, as indicated in Figs. 1, 3, 4, and 6—or it may be of the general form and configuration of the standard box-lids heretofore used, as is indicated in Figs. 8, 10, 12, 14, and 16, said last-mentioned figure, indeed, illustrating box-lids of typical form divested of their character as lids and made to serve the purpose of simple spring-supporting plates, the closing of the box being effected by the attached plates B.

I have indicated at $B^3$, Figs. 4 and 5, a lipped projection from the lower end of the lid-plate B, provided as a convenient means of getting hold of the lid to raise it. In the other views the lip for raising the lid is indicated at $D^2$ and is a part of the spring-supporting plate.

The other features of construction shown in the drawings relate to different means for securing the plates B and $D'$ together and for securing the springs (indicated at E) to the spring-supporting plate. Thus in Figs. 1 and 2 an angle-shaped iron bolt H is riveted, as indicated at $H'$, to the plate B and extends across the central downwardly-extending part of the plate $D'$. A recess $D^5$ is formed in the lower part of the extension of the plate $D'$, and the spring E, provided with a downwardly-turned lip $E'$, is forced under the loop or stirrup H, its lipped end resting in the recess $D^5$. The contact between the plates $D'$ and B is in this construction formed by a downwardly-curved portion $D^4$ of the plate $D'$, resting against the downwardly-curved portion $B^4$ of the plate B, and it will be obvious that the plate B will, by the mode of attachment to the plate $D'$ described, be quite free to adjust itself to the seat $A'$, irrespective of the particular alinement of the spring-supporting plate $D'$.

In Figs. 3 and $3^a$ the construction of the plates $D'$ and B is much the same as in Figs. 1 and 2; but in place of using the stirrup H, I here show the spring E secured to the spring-supporting plate by a rivet G and the plate $B'$ secured to the plate by a loose rivet F. I have also shown (see Fig. $3^a$) a double curvature from the downwardly-curved portion $D^4$ of the plate $D'$, which it is obvious will facilitate the angular adjustment of the plates B and $D'$ with respect to each other. The portions marked $D^3$ in Figs. 1 to 3 indicate light walls thrown up to keep the spring in proper alinement.

In Figs. 4 and 5 I form the plate $D'$ with a lip $D^6$ on its upper face, beneath which the spring E is passed, its lipped end $E'$ here being anchored in a transverse recess $B^7$, formed in the plate B, said plate B being formed with outwardly-extending lugs $B^5$, each having a groove and inwardly-extending lip $B^6$, in which rest pins $D^8$, secured to lugs $D^7$, extending from the lower part of the plate $D'$.

In Figs. 6 and 7 the spring E is riveted to the top of the plate $D'$, and the said plate is formed with a transverse recess $D^9$, in which rests a pin I, extending across between two lugs $B^8$, thrown up on the upper face of the plate B.

In Figs. 8 and 9 the plate $D'$ is shown as of the typical form of the hooded box-lid now in use, the spring E being riveted to its under side and two downwardly-curved portions $D^{10}$ being formed on each side of the hood which rest against the top of the plate B and are secured to it by loose rivets or other fastenings, as indicated at J J.

In Figs. 10 and 11 the familiar form of hooded lid is shown as serving the purpose of the spring-supporting plate $D'$, a U-shaped stirrup K serving to engage the lipped end $E'$ of the spring and also to support a hook L, to which hook is attached the plate B.

In Figs. 12 and 13 another familiar type of lid is shown, a transverse passage $D^{11}$ being formed through the lid through which the spring E is passed and a recess $D^{12}$ being provided to engage the lipped end of the spring. In this construction I pass a plate M through the passage $D^{11}$ and into the recess $D^{12}$, curving its inner end downward, as shown, and securing the plate B to it.

In Figs. 14 and 15 the spring E is riveted to the inside of the plate $D'$, and the plate B is secured to the plate $D'$ by a U-shaped stirrup N passing over the spring and beneath a recess $D^{13}$ in the plate $D'$.

In Figs. 16 and 17 a construction is shown in which a lipped spring E is anchored in place in a hook-like extension of the loop $D^2$ of the plate $D'$, a U-bolt N, riveted to the plate B, resting in a recess $D^{14}$ of the plate $D'$ and, as in the last case mentioned, above the spring E.

In Figs. 18 and 19 a construction is shown in which the plates $D'$ and B are formed and secured together much as is shown in Figs. 3 and $3^a$, except that in place of the rivet F extending through the abutting surfaces $D^4$ and $B^4$, I here show a rivet (indicated at $F'$) which is formed integral with the plate $D'$ and passes through a hole $b^4$ in the plate B, upon the under side of which it is loosely riveted.

The device for securing the spring in place (shown in Figs. 18 to 21) is also new and, I believe, meritorious. A loop $D^6$ is thrown up from the upper face of the plate $D'$, while below it is formed a pin $B^{17}$, with its upper face made of tapering or wedge shape, as shown, and below this pin is formed an abutment $D^{16}$. The spring E in this construction is formed with an opening $E^2$ of dimensions similar to that of the pin $D^{17}$, and the spring is secured in place by inserting its lower end beneath the loop $D^6$ and driving it downward until it rides upon the top of the wedge-shaped pin $D^{17}$ and the opening $E^2$ is forced to register with said pin, when the lower end of the spring will move downward to the position shown in Figs. 19 and 21, and all further downward motion of the spring is opposed by the abutment $B^{16}$.

In Figs. 20 and 21 I have shown the plate B as provided with a downwardly-extending lip $B^6$, formed around the outside of its bearing-surface B'. This inwardly-extending lip may, of course, be used in connection with the inwardly-extending abutment $B^2$, or it may take the place of this abutment, as is indicated in the construction of Figs. 20 and 21.

Where the plate B is secured to the plate D' by a single rivet, as shown in Figs. 3, 19, and 21, or any other means which permits the plate B to turn with respect to the plate D', the proper alinement of the plate B may be secured by bringing its top edge into close proximity with the lower face (indicated at $a^2$) of the horn $A^2$, as is shown in Figs. 1, 2, 18, and 19.

It will be obvious that all of the modifications shown and above described equally embody the broad features of my invention and also that it is capable of embodiment in a great number of forms, the essential point being that the plates B and D' shall in all cases be so secured together as to leave the plate B free to adjust itself to its bearing on the box while subjecting it to the pressure of the spring secured on the plate D'.

Having now described my invention, what I claim as new, and desire to secure by Letters Patent, is—

1. An axle-box lid having in combination a plate adapted to close the opening in the axle-box, a spring-supporting plate having pintle-hinge eyes and adapted to be hinged to the box, and means for loosely connecting the box-closing and spring-supporting plates together and so that the closing-plate can seat itself evenly on the box.

2. An axle-box lid having in combination a plate as B provided with a seat B' and inwardly-extending flange $B^2$ and adapted to close the opening in the axle-box, a spring-supporting plate having pintle-hinge eyes and adapted to be hinged to the box, and means for loosely connecting the box-closing and spring-supporting plates together and so that the closing-plate can seat itself evenly on the box.

3. An axle-box lid having in combination a plate B adapted to close the opening in the axle-box, a spring-supporting plate D' having pintle-hinge eyes D D and a downwardly-curved abutment-surface $D^4$ adapted to rest against plate B and a loose connection as rivet F' securing plates B and D' together.

4. An axle-box lid having in combination a plate B adapted to close the opening in the axle-box and having a downwardly-curved abutment-surface $B^4$, a spring-supporting plate D' having pintle-hinge eyes D D and a downwardly-curved abutment-surface $D^4$ adapted to rest against the curved surface $B^4$ of the plate B and a loose connection as rivet F' securing plates B and D' together.

5. An axle-box lid having in combination a plate B adapted to close the opening in the box and formed with a rivet-opening $b^4$, a spring-supporting plate D' having hinge-eyes D D a downwardly-curved abutment-surface $D^4$ and a rivet F' formed integral with plate D' and adapted to extend through opening $b^4$ and secure the plates loosely together.

6. In an axle-box lid the combination with a plate D' having a loop $D^6$ and outwardly-extending wedge-topped pin $D^{17}$, of a spring E having an opening $E^2$ adapted to engage said pin as described.

7. In an axle-box lid the combination with a plate D' having a loop $D^6$, outwardly-extending wedge-topped pin $D^{17}$, and abutment $D^{16}$ of a spring E having an opening $E^2$ adapted to engage said pin as described.

NATHAN H. DAVIS.

Witnesses:
CHAS. F. MYERS,
D. STEWART.